United States Patent [19]
Lamo

[11] Patent Number: 5,613,891
[45] Date of Patent: Mar. 25, 1997

[54] FOOT OPERATED ANIMAL CALLER

[76] Inventor: Ralph J. Lamo, 11 East St., Annandale, N.J. 08801

[21] Appl. No.: 546,941

[22] Filed: Oct. 23, 1995

[51] Int. Cl.⁶ .................................................. A63H 5/00
[52] U.S. Cl. .............................. 446/26; 446/81; 446/188; 446/193; 446/208
[58] Field of Search .................................. 446/26, 28, 81, 446/180, 183, 184, 188, 192, 193, 197, 205, 206, 208, 209, 397

[56] References Cited

U.S. PATENT DOCUMENTS

| | | | |
|---|---|---|---|
| 1,311,690 | 7/1919 | Hakius | 446/205 |
| 2,012,858 | 8/1935 | Tannenbaum | 446/81 |
| 2,072,786 | 3/1937 | Yager | 446/208 |
| 2,461,588 | 2/1949 | Cooper | 446/81 |
| 2,835,077 | 5/1958 | Mittelsteadt | 446/208 |
| 3,715,448 | 2/1973 | Itoh . | |
| 3,968,592 | 7/1976 | Piper | 446/193 |
| 4,083,742 | 4/1978 | Sugimopto | 446/184 |
| 4,612,001 | 9/1986 | Burnham | 446/208 |
| 4,642,065 | 2/1987 | Whedon et al. | 446/209 |
| 4,997,402 | 3/1991 | Blease | 446/202 |
| 5,122,088 | 6/1992 | Meline | 446/206 |
| 5,125,863 | 6/1992 | Huspen | 446/268 |
| 5,136,726 | 8/1992 | Kellin et al. | 446/901 |

*Primary Examiner*—Robert A. Hafer
*Assistant Examiner*—Jeffrey D. Carlson
*Attorney, Agent, or Firm*—Ezra Sutton

[57] ABSTRACT

An animal caller including a pouch-like housing having top and bottom walls and an opening for forming a pouch pocket, and attachment means on the bottom wall for securing the pouch-like housing to a surface. The animal caller also includes a bellows assembly for producing a strong current of air disposed within the pouch pocket, and a reed assembly for producing a specific animal sound being detachably connected to the bellows assembly. The reed assembly has detachable and interchangeable reed housings for different animal calls, and the reed assembly has at least two flexible and interlocking calling tubes movable relative to each other to vary the pitch and/or tone of the animal call and to direct the animal call to a given direction.

14 Claims, 4 Drawing Sheets

FOOT OPERATED ANIMAL CALLER

FIELD OF THE INVENTION

This invention relates to a new type of animal caller, and more particularly, this invention relates to a foot operated animal caller used by bow hunters and photographers and having an integrally attached reed and a bellows assembly contained within a cloth pouch.

BACKGROUND OF THE INVENTION

Animal callers have taken many forms in relation to appearance, shapes, functionality, and types of materials used. Generally, animal callers have been hand-held devices in which the user holds the animal caller to his/her mouth and blows into the mouth piece having an animal sounding reed which produces a given animal sound. The user can typically keep the animal caller clenched between their teeth but usually one or both hands are needed to operate the animal caller properly. However, the user cannot hold their bow, rifle, shotgun, or camera at the ready while calling with an animal caller held in the users' hand(s). Even if the animal caller is held by the mouth only, typically, what happens is the bow, gun, or camera may be interfered with by the animal caller being held in the mouth as the user prepares for a shot. Alternatively, the user usually removes the animal caller from his/or her mouth and puts it away in a pocket, and this creates excessive movement which is likely to scare away the animal, such as a whitetail deer, at the critical moment of the shot.

There remains a need for a portable, non-hand held animal caller that is easily operated, and which eliminates all unnecessary hand movement, such as removing the animal caller from the mouth, allowing the users' hands to be free to hold the weapon or camera at the ready for a proper shot; and without interference from the animal caller. Preferably, the animal caller can be operated by the users' foot, but alternatively, it may be operated by the armpit or by leaning against the animal caller with portions of the body, such as the back or leg. The animal caller may be positioned on a plank, rock, tree, fence, and the like, and the user applies pressure with a body part to produce the animal call frequency needed to call the animal into view. This enables the hunter or photographer to continue calling right up to the time when a proper shot is taken, with minimal body movement.

DESCRIPTION OF THE PRIOR ART

Animal callers of various designs, styles, appearances, and materials of construction have been disclosed in the prior art. For example, U.S. Pat. No. 3,172,223 discloses a muskrat call and decoy device used for the hunting or photographing of muskrats in the wild. This device comprises a muskrat decoy body and an air pressure assembly connected to the body having an audible muskrat call. The air pressure assembly produces movement and sound by the use of a manual (hand-operated) squeeze bulb which forces air through a tube to produce movement of the decoy's extremities and sound through the decoy head portion. The muskrat sound or call is produced by the passing of the forced air through a reed within a housing located in the head portion The bulb is shown to have a generally round shape for fitting in the hand so as to be squeezed. The round shape does not allow for foot operation and there is no teaching of foot operation. Further, a hunter using this device would typically be in a tree blind or a boat and would not be able to operate it by foot. Therefore, this prior art device does not show a foot operated animal caller device, or a relatively flat bellows component for stepping on, or a holding device, such as a Velcro tab for mounting the bellows on a ground plate, plank, rock, or tree such that the user produces an animal call by stepping on the flat bellows to produce the animal call which keeps the users' hands-free for hunting or photographing of the animal called.

Accordingly, it is an object of the present invention to provide an animal caller that is completely hands-free and mouth-free and is foot-operated by the user for producing a continuous and on-going animal call, leaving the users' upper body area and hands free for taking a proper shot of the animal being sought and called with a bow, gun, or camera.

Another object of the present invention is to provide an animal caller that can be detachably mounted on various types of natural terrain such as the ground, trees, rocks, bushes, fallen logs, or on man-made objects such as tree blinds, fences, planks, and the like.

Another object of the present invention is to provide an animal caller having a reed assembly with detachable and interchangeable reed components having different sounds for different animal calls; such that different reed components can be carried and used by the hunter or photographer for calling several types of different animals during the course of a hunt.

Another object of the present invention is to provide an animal caller having a reed assembly with a flexible, bendable sounding tube that can be extended or retracted to vary the tone or pitch of the animal call sound; and capable of being bent in different directions for projecting the animal call being sounded.

Another object of the present invention is to provide an animal caller having a bellows assembly for producing a self-adjusting and self-reproducing air stream to give a continuous and on-going animal call when the user applies foot pressure to the bellows component of the present invention.

An even further object of the present invention is to provide for an animal caller that can be mass produced in an automated and economical manner and is readily affordable by the user.

SUMMARY OF THE INVENTION

In accordance with the present invention, there is provided a foot operated animal caller used by bow hunters, photographers, or naturalists for calling of a specific animal, like a deer, for hunting or photographing. The animal caller includes a pouch-like housing having top and bottom walls and an opening for forming a pouch pocket, and attachment means on the bottom wall for securing the pouch-like housing to a surface. The animal caller also includes a bellows assembly for producing a strong current of air disposed within said pouch pocket, and a reed assembly for producing a specific animal sound being detachably connected to the bellows assembly. The reed assembly has detachable and interchangeable reed housings for different animal calls, and The reed assembly has at least two flexible and interlocking calling tubes movable relative to each other to vary the pitch and/or tone of the animal call and to direct the animal call to a given direction.

BRIEF DESCRIPTION OF THE DRAWINGS

Further objects, features, and advantages of the present invention will become apparent upon consideration of the detailed description of the presently-preferred embodiments, when taken in conjunction with the accompanying drawings wherein.

DETAILED DESCRIPTION OF THE PREFERRED EMBODIMENT

Figure 1:
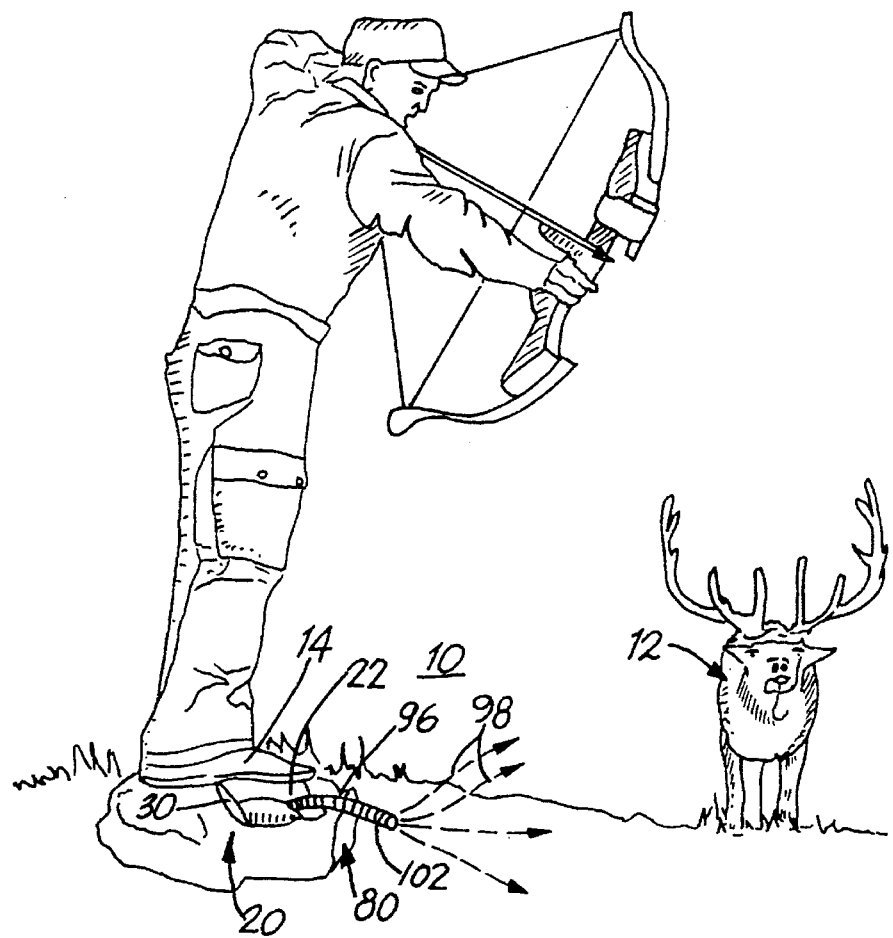
FIG. 1 is a perspective view of the animal caller of the present invention showing a bow hunter preparing for a shot at a deer while using his foot to operate the bellows and reed assemblies for sounding out a deer call.
Figure 2:
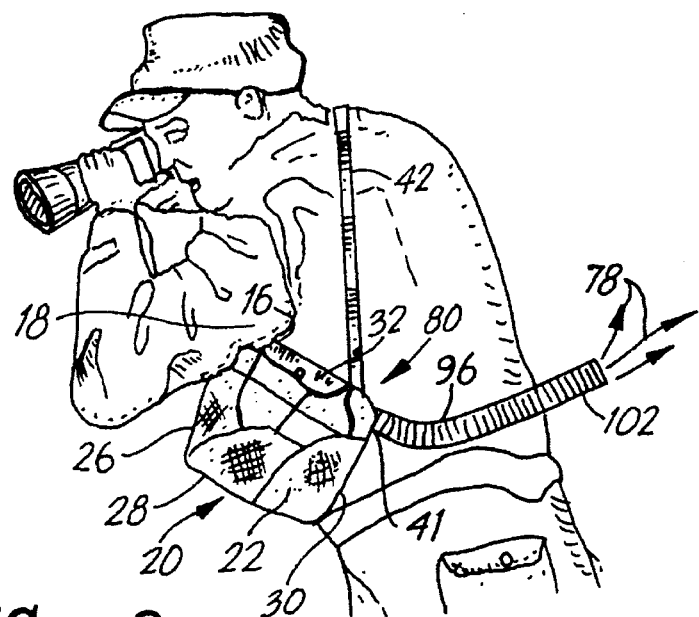
FIG. 2 is a perspective view of the animal caller showing a photographer photographing a deer while his armpit is used to operate the bellows and reed assemblies for sending out a deer call.
Figure 3:
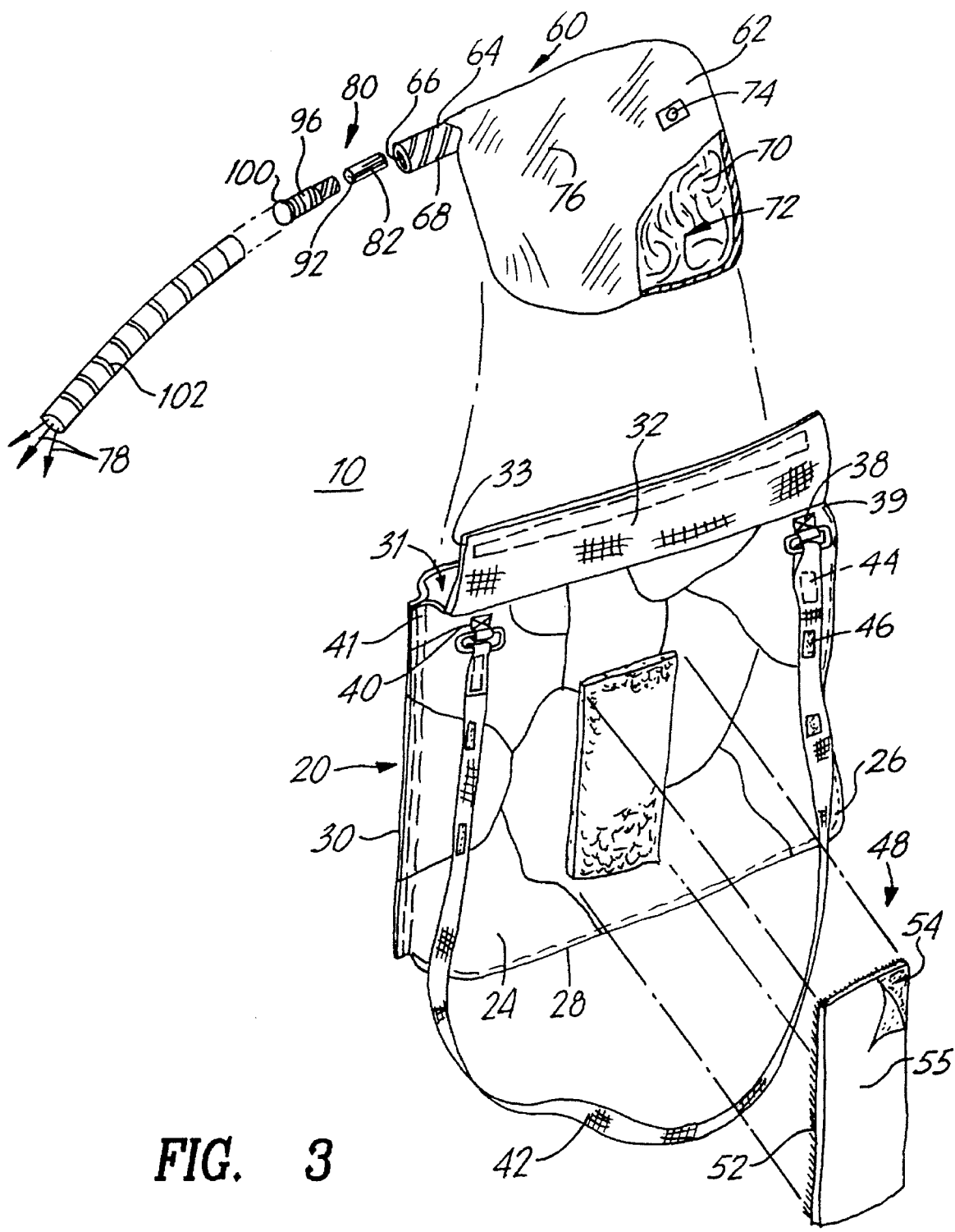
FIG. 3 is an exploded perspective view of the animal caller of the present invention showing all of its component parts.
Figure 4:
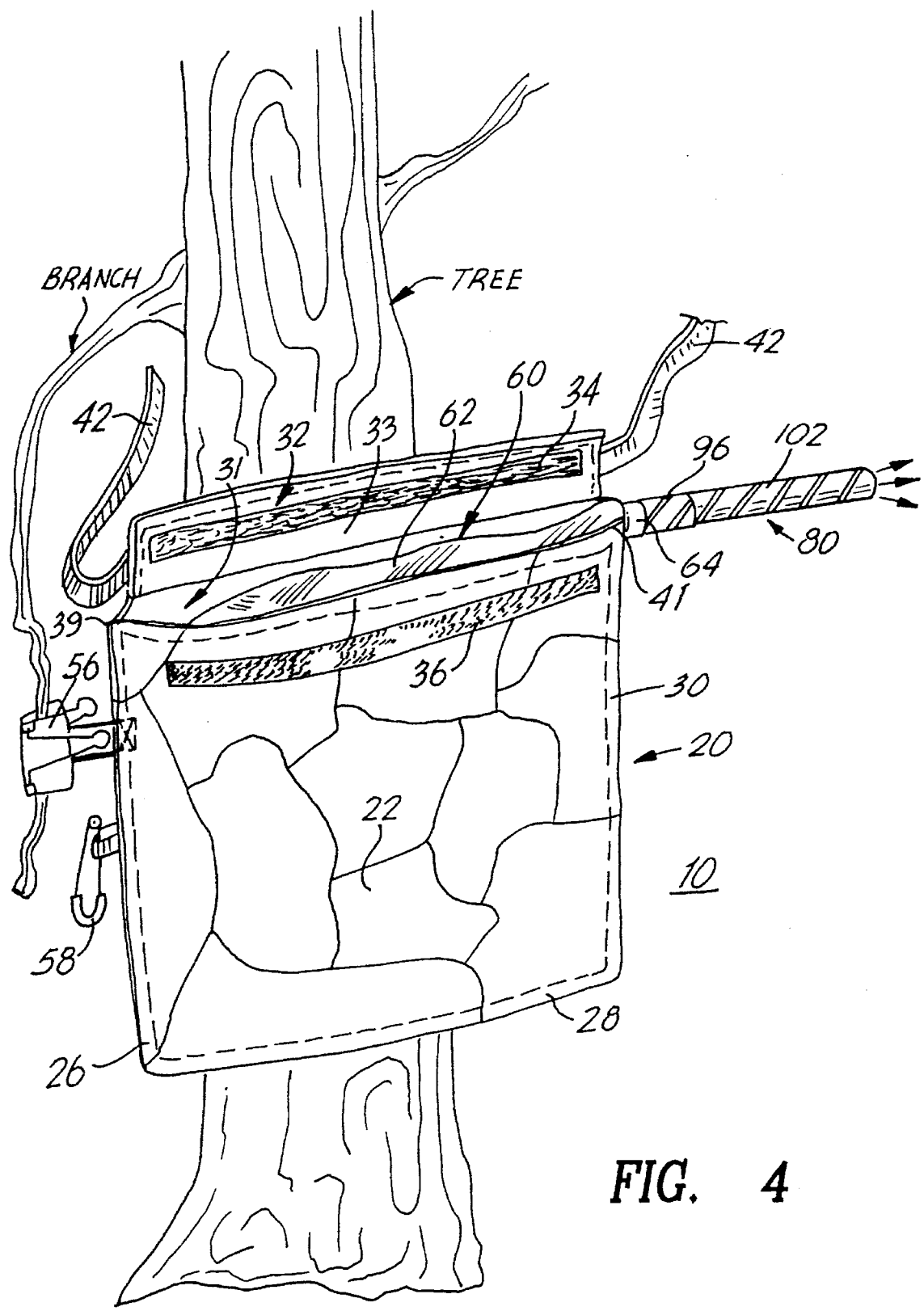
FIG. 4 is a front elevational view of the animal caller showing the various attachment pins and being attached to a tree branch.

The preferred embodiment of the present invention provides for a portable, foot-operated animal caller 10, used for hunting or photographing of a given animal, and is represented in FIGS. 1 through 4 of the drawings. FIG. 1 shows the animal caller 10 in an operational mode for hunting. FIGS. 3 and 4 show the animal caller 10 and its component parts therein. The portable, foot operated animal caller 10 includes a cloth pouch-like housing 20, a bellows assembly 60 contained within housing 20 for producing a strong current of air 78 and a reed assembly 80 being attached to the bellows assembly 60 for producing different sounds or calls for calling a particular animal 12.

The cloth housing 20 being pouch-like, as depicted in FIGS. 1, 2, and 3, includes a top wall 22 and a bottom wall 24 being connectedly sewn together along three perimeter edges 26, 28, 30 for forming a pouch with a pocket opening 31. Bottom wall 24 has an extended section being a closure flap 32 having Velcro closure tabs 34 and 36 located on the inside surface 33 of flap 32 and top surface 22 of housing 20. The cloth housing 20 can be made from materials such as cotton, cotton/polyblend, canvas, burlap, linen and the like. The housing 20 can have various colors to match the environmental surroundings of the four seasons, such as white for winter, green for spring and summer, or orange for the fall. Housing 20 may also have camouflage patterns of various colors imprinted on the top and bottom surfaces of walls 22 and 24, respectively, for disguising the animal caller 10 when used for hunting or photographing a particular animal while in the woods.

Housing 20 also includes strap holders 38 and 40 located in the upper corners 39 and 41 of perimeter edges 26 and 30 for holding an adjustable strap 42. The adjustable strap 42 has a plurality of Velcro adjustment tabs 44 and 46 for varying the length of strap 42 to the users' convenience. Housing 20 further includes Velcro attachment means 48 having a bottom hook section 50 being integrally attached and centrally located to bottom surface wall 24 and a portable attachment eye section 52 having an adhesive surface area 54 for attaching to a particular surface such as a rock, tree, wood plank, stool, and the like. Attachment means 48 provides for a secure, non-movable, and stationary mode in which the animal caller 10 is to be operated by foot 14, as shown in FIG. 1. The method of operation is explained in a later section. The attachment means 48 also includes a detachable plastic cover 55 for protecting the adhesive surface 54 when not in use. The housing 20 can also have an attachment clip 56 or pin 58 located in the adjacent corner area 39 of the upper perimeter edge 26 for attaching housing 20 to a tree branch, chair back, stool leg, and the like.

The bellows assembly 60 includes a bellows housing 62 having an integrally attached, semi-rigid connector tube 64 with a hole opening 66 for receiving and holding in place reed housing 82; and external attachment threads 68 thereon for attaching tube 64 to the inside of flexible tube 96. Bellows housing 62 further includes a loose synthetic fiber fill 70 being located in the internal volumetric space 72 of housing 62 which has the characteristic of automatically expanding after being compressed to allow air to be drawn into space 72 to expand bellows housing 62, for a physical inflating of the bellows assembly 60 with air 78. Bellows housing 62 can also have an external valve 74 centrally located on the outer surface area 76 of housing 62 for partial inflation by air 78. Bellows housing 62 can be made from materials such as plastic, rubber or a rubberized plastic and the like, for ease of air inflation.

The reed assembly 80 includes a detachable, rigid cylindrical housing 82 having front and rear hole openings 84 and 86 for insertion of sounding/calling reed 90 towards the front end 88 of hole opening 84. Sounding reed 90 is for a specific animal 12, i.e. a whitetail deer, and housing 82 can be detached from the reed connector tube 64 and interchanged with an identical reed housing 82' having a different sounding reed 90' for another specific animal 12', i.e. a elk. There can be various interchangeable reeds 90 for producing a variety of animal calls or sounds such as deer, turkey, pheasant, mule deer, elk, moose, coyote, fox, bear, wolf, and other small game being hunted by hunters or photographed by animal naturalists. Sounding reed 90 can be made of various types of metals and plastics. Hole openings 84 and 86 have nylon fiber mesh covers 92 and 94 attached to reed housing 82 for the protection of the reed 90 from any extraneous matter, such as dirt, dust, loose fibers, and the like. Such extraneous matter could interfere with a proper sounding of the animal call used.

Figure 5:
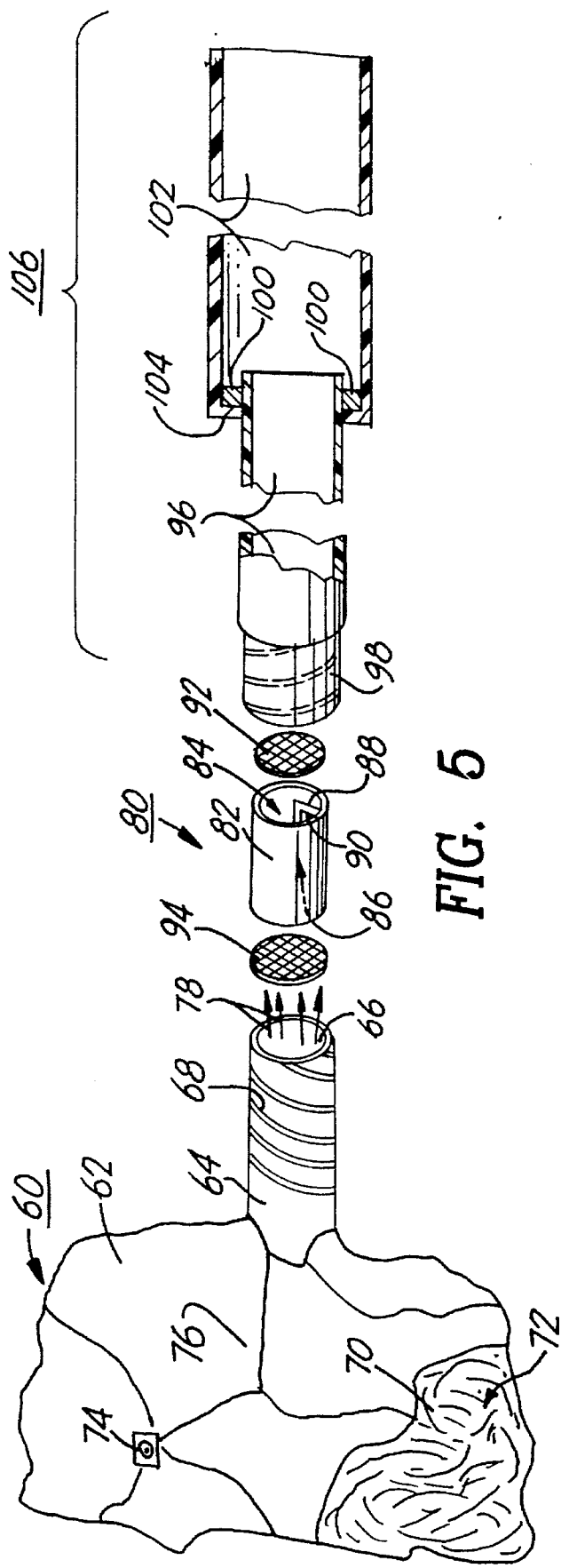
FIG. 5 is an exploded perspective view of the bellows and reed assemblies showing all of their component parts contained therein.
Figure 6:
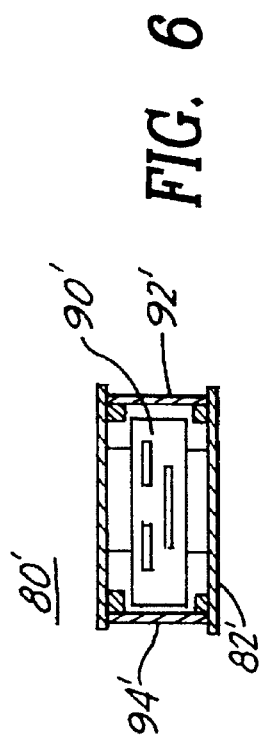
FIG. 6 is a cross sectional view through the detachable and interchangeable reed housing showing the reed component parts contained therein.

Reed assembly 80 further includes bendable, flexible, and serrated inner and outer calling tubes 96 and 102 which are movable relative to each other for varying the sounds made by reed 90. Inner tube 96 has at one end internal threads 98 for receiving therein connector tube 64 and for connecting to the external threads 68. At the other end there is an outer lip 100 for engaging the inner lip 104 of outer tube 102 which is used for stopping of the outer tube 102 in its most extended position 106. When outer tube 102 is in its most extended position 106 in relation to inner tube 96, as depicted in FIG. 5, a deeper or higher toned animal sound/call is produced. Conversely, when outer tube 102 is in its most retracted position 108, as depicted in FIG. 1, a lower toned animal call is produced. In addition, the inner and outer tubes 96 and 102 are readily bendable and can be directed to different compass directions for enticing a particular animal 12 being called to the users' position in the woods. The inner and outer tubes 96 and 102 are made of a light weight and durable plastic.

OPERATION OF THE PRESENT INVENTION

In operation the portable, foot operated animal caller 10 is readily put into operational use. First, the user selects the desired reed housing 82 having a sounding reed 90 for attracting the particular animal 12 being hunted or photographed. After the selection of reed 90 for a given animal call 12, reed housing 82 is then inserted into opening 66 of connector tube 64 and mounted therein with the front end 88 facing toward tube 102, as shown in FIG. 5 of the drawings. Inner tube 96 is then threadedly attached to connector tube 64, such that reed housing 82 is firmly in place in tube 64; and reed assembly 80 is now connected to the bellows assembly 60. The user then inserts the bellows housing 62 into the pouch pocket 31 of cloth housing 20 and closes flap 32 with closure tabs 34 and 36, leaving the inner and outer tubes 96 and 102 extending out at the upper corner 41 adjacent to perimeter edge 30, as shown in FIG. 1 and 2.

The user then selects a proper venue within the woods for hunting or photographing the particular animal to be shot or photographed, such that the user can be in a tree blind, a camouflaged enclosure, behind a tree, bush, or rock, etc. The user then removes the adhesive cover 55 from the adhesive surface area 54 and places the adhering portable attachment eye section 52 on an appropriate surface to be used, i.e. a plank or flat rock. The user than attaches the hook section 50 of housing 20 to the eye section 52 which now firmly places the animal caller 10 in a secured, non-movable position. If attachment means 48 could not be used, the user could alternatively use the attachment clip 56 or large safety pin 58, and attach the animal caller 10 to a fence, a bush, or a tree, in which the aforementioned clip 56 or pin 58 provides a secured, non-movable position for animal caller 10 to be used in a proper fashion.

The animal caller 10 is now ready to be used for a specific animal 12; i.e. whitetail deer, such that the user then places his/her foot 14 on the outside of top surface 22 of housing 20, such that the users' foot 14 lightly applies pressure onto the bellows assembly 60 forcing air 78 through the connector tube 64 which in turn forces air 78 through the sounding reed 90 with the sound of the animal call exiting through tubes 96 and 102 in the direction selected. This produces the sound of the animal call, and in this case a low toned "grunt" of a whitetail deer 12. The user can vary the tone or the pitch of the animal sound/call from reed 90 by extending or retracting the interlocking calling tubes 96 and 102 to positions 106 or 108 or somewhere in between, as shown in FIG. 3 and 5.

If the user is unsuccessful in attracting the game animal 12 originally sought, the user can then interchange to another reed assembly 80' having a different animal call produced by reed 90', i.e. being an elk to hunt or photograph. The user would only have to unscrew tube 96 from connector tube 64, dislodge reed housing 82 and re-insert the new reed housing 82' having the elk call reed 90'. The user could have several different reed assemblies 80, 80', 80" etc at the users' disposal, representing several different species of game animals to be hunted or photographed.

If the user wanted to walk while hunting or photographing, the animal caller 10 has an adjustable strap 42 with closure tabs 44 and 46 and would be fitted about the users' torso, as shown in FIG. 2, such that the user can then place the cloth housing 20 under the users' armpit 16 to operate, and still have the hands and mouth free for taking an appropriate shot with a weapon or camera. The user produces the animal call from reed 90' by pressing the users' upper arm (bicep area) 18 on the bellows assembly 60 and forcing air 78 through connector tube 64 which in turn forces air 78 through sounding reed 90 with the sound of the animal call exiting through calling tubes 96 and 102. This produces the sound of the animal call, and in this case it is a low toned "grunt" of an elk.

Several other positional variations may be used for animal caller 10 wherein adjustable strap 42 may be placed on the users' body, back, buttocks, thigh, tree, fence, etc for leaning against and applying pressure to the bellows assembly 60 to produce the animal call from reed 90', while still leaving the users' hands free for taking a shot by a weapon or camera.

ADVANTAGES OF THE PRESENT INVENTION

Accordingly, an advantage of the present invention is that it provides for an animal caller that is completely hands and mouth free and is foot-operated by the user for producing a continuous and on-going animal call, leaving the users' upper body area and hands free for taking a proper shot of the animal being sought and called with a bow, gun, or camera.

Another advantage of the present invention is that it provides for an animal caller that can be detachably mounted on various types of natural terrain such as the ground, trees, rocks, bushes, fallen logs, or on man-made objects such as tree blinds, fences, planks, and the like.

Another advantage of the present invention is that it provides for an animal caller having a reed assembly with detachable and interchangeable reed components having different sounds for different animal calls; such that different reed components can be carried and used by the hunter or photographer for calling several types of different animals during the course of a hunt.

Another advantage of the present invention is that it provides for an animal caller having a reed assembly with a flexible, bendable sounding tube that can be extended or retracted to vary the tone or pitch of the animal call sound; and capable of being bent in different directions for projecting the animal call being sounded.

Another advantage of the present invention is that it provides for an animal caller having a bellows assembly for producing a self-adjusting and self-reproducing air stream to give a continuous and on-going animal call when the user applies foot pressure to the bellows component of the present invention.

Another advantage of the present invention is that it provides an animal caller that does not use the breath of the hunter or photographer to force air through the reed assembly to produce sound. In colder climates, the condensation from one's breath could cause the reed to freeze up thus changing the tone or clogging the call altogether. By operating the animal caller with your foot, you also avoid the discomfort of holding the caller in your mouth.

An even further advantage of the present invention is that it provides for an animal caller that can be mass produced in an automated and economical manner and is readily affordable by the user.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. An animal caller comprising:
    a) a pouch-like housing having top and bottom walls and an opening for forming a pouch pocket, and attachment means on the bottom wall for securing said pouch-like housing to a surface;

b) a bellows assembly for producing a strong current of air disposed within said pouch pocket;

c) a reed assembly for producing a specific animal sound being detachably connected to said bellows assembly;

d) said reed assembly having detachable and interchangeable reed housings for different animal calls; and e) said reed assembly having at least two flexible and interlocking calling tubes movable relative to each other to vary the pitch and/or tone of the animal call and to direct the animal call to a given direction.

2. An animal caller in accordance with claim 1, wherein said pouch-like housing includes a flap having closure means for closing said housing.

3. An animal caller in accordance with claim 1, wherein said pouch-like housing is made from cotton, cotton/poly-blend, canvas, burlap, and linen.

4. An animal called in accordance with claim 1, wherein said pouch-like housing has camouflage patterns or solid colors of any one of orange, brown, white, or green for blending with the seasons of fall, winter, spring, and summer.

5. An animal caller in accordance with claim 1, wherein said attachment means are made of a hook and loop fastener.

6. An animal caller in accordance with claim 1, wherein said housing has a pair of strap holders and an adjustable strap having hook and loop fasteners for placing said pouch-like housing about the user's body.

7. An animal caller in accordance with claim 1, wherein said bellows assembly includes a bellows housing having an air-inlet valve for inflating.

8. An animal caller in accordance with claim 1, wherein said bellows assembly includes a connector tube for holding in place said detachable and interchangeable reed housing.

9. An animal caller in accordance with claim 7, wherein said bellows housing contains a fiber fill therein for self-inflating said bellows housing.

10. An animal caller in accordance with claim 7, wherein said bellows housing is inflatable and is made of any one of plastic, rubber, or rubberized plastic for inflation by air.

11. An animal caller in accordance with claim 1, wherein said reed housing includes a sounding/calling reed for producing sounds of a specific animal call.

12. An animal caller in accordance with claim 11, wherein said reed housing includes a pair of spaced apart covers for the protection of said sounding/calling reed from any one of dirt, dust, or loose fibers.

13. An animal caller in accordance with claim 11, wherein said sounding/calling reed is made from metal or plastic.

14. An animal caller in accordance with claim 1, wherein said interlocking calling tubes are made of a light-weight plastic.

\* \* \* \* \*